United States Patent [19]

Ulmer

[11] 4,187,440
[45] Feb. 5, 1980

[54] ELECTROMAGNETIC ENGINE

[76] Inventor: Jamie F. Ulmer, Rte. 5, Hwy. 70, Mount Juliet, Tenn. 37122

[21] Appl. No.: 913,672

[22] Filed: Jun. 8, 1978

Related U.S. Application Data

[63] Continuation-in-part of Ser. No. 801,143, May 27, 1977, abandoned.

[51] Int. Cl.² .............................................. H02K 33/12
[52] U.S. Cl. .......................................... 310/24; 310/34; 310/35
[58] Field of Search ................. 290/1; 310/15, 23, 24, 310/30, 34, 35; 60/545, 581, 594

[56] References Cited

U.S. PATENT DOCUMENTS

| 2,588,753 | 3/1952 | Norton | 310/24 UX |
| 3,247,406 | 4/1966 | Toësca | 290/1 X |
| 3,437,044 | 4/1969 | Sanders et al. | 310/24 X |
| 3,675,031 | 7/1972 | Lavigne | 290/1 |
| 3,681,629 | 8/1972 | Drye | 310/30 X |

*Primary Examiner*—Donovan F. Duggan
*Attorney, Agent, or Firm*—Abe Hatcher

[57] ABSTRACT

Intermediate ram operated electromagnetically connects at least two cylinders to operate them reciprocally and drive a vehicle or the like.

1 Claim, 3 Drawing Figures

U.S. Patent  Feb. 5, 1980  4,187,440
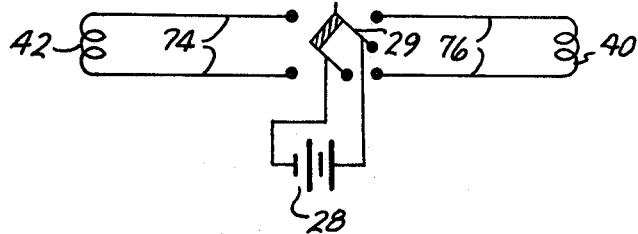
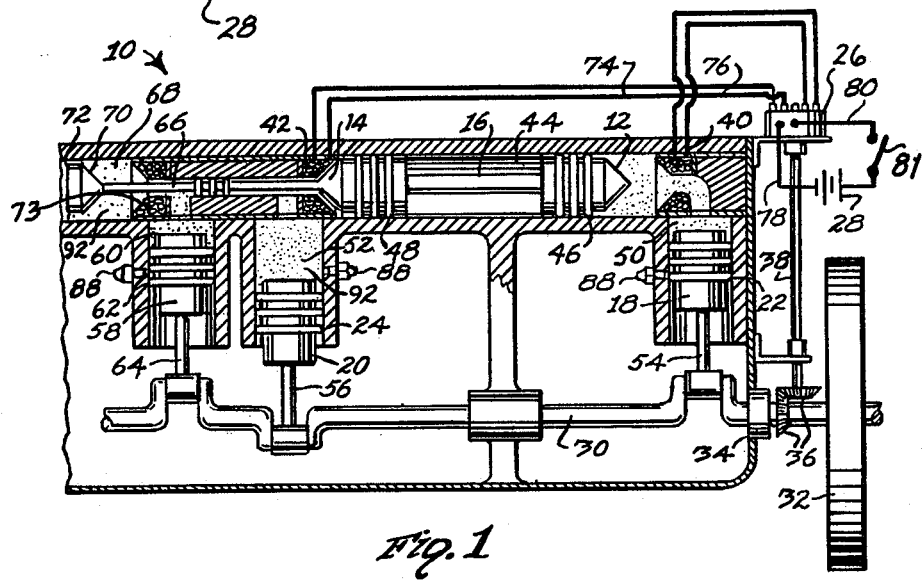
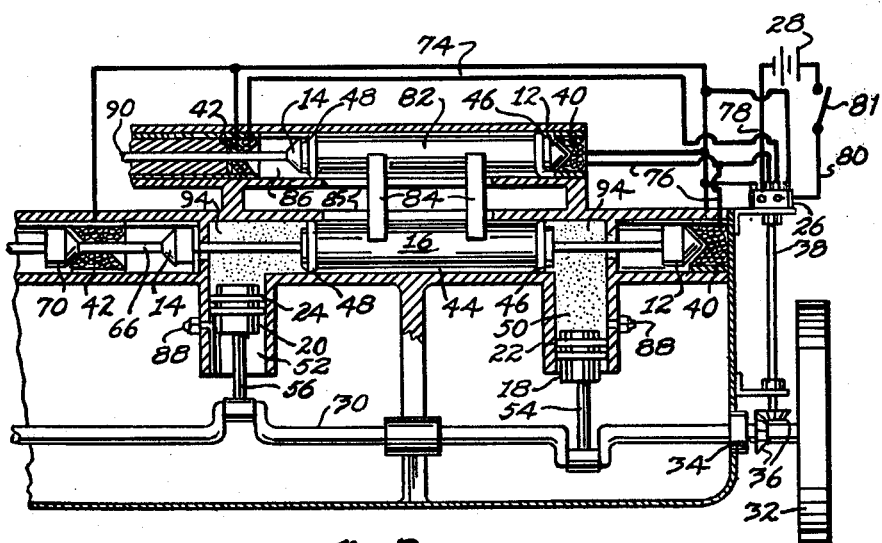

ELECTROMAGNETIC ENGINE

BACKGROUND OF THE INVENTION

This application is a continuation-in-part of Ser. No. 801,143, filed May 27, 1977 now abandoned.

1. Field of the Invention

This invention relates to an electromagnetic motor. More particularly, it relates to an engine having two or more cylinders driven reciprocally by an electromagnetically charged ram therebetween.

2. Description of the Prior Art

In U.S. Pat. No. 3,811,058 to Kiniski, two reciprocating pistons in an engine block utilizing an electric motor to rotate the pistons through magnetic fields are described.

SUMMARY OF THE INVENTION

I have found that a more efficient arrangement and one which is practical for operation of an electric vehicle, for example, involves positioning a ram or reciprocating rod between two reciprocating pistons. Electrical coils located at the respective ends of the cylinder in which such an intermediate ram or piston is located are alternately energized by a battery connected to a suitable distributor so that the ram moves from side to side in a reciprocating manner, its ends being alternately magnetized, like the plunger of a solenoid device, so as to move back and forth in accordance with the energization of the attracting coil of the cylinder in which it is located. The two reciprocating pistons respond in an upward and downward manner and move according to the back and forth movement of the ram in accordance with the pressure laws, much as in a conventional internal combustion engine except that the gas is air instead of gasoline vapor, although any known transmission fluid, even in liquid form, may be used in the three connecting cylinders according to my invention.

According to an alternate embodiment of my invention I employ a booster rod above the intermediate ram. Also, according to my invention, as many as eight or more of my cylinders with connecting rams may be used in a row, for example, to power an automobile.

DESCRIPTION OF THE DRAWING

For a better understanding of my invention reference will now be made to the drawing which forms a part hereof and which represents a preferred embodiment of my invention.

in the drawing,

FIG. 1 is a schematic diagram, partly in longitudinal cross section and partly in perspective from one side, illustrating one embodiment of the electromagnetic engine of my invention;

FIG. 2 is similar to FIG. 1 except for showing an alternate embodiment in which a booster rod may be used to increase the efficiency of my two or more cylinders with intermediate electromagnetically powered rams between each two; and FIG. 3 is a schematic diagram of an electrical circuit employed in the invention.

PREFERRED EMBODIMENTS OF THE INVENTION

Referring now to the drawing, the figures thereof show an electromagnetic reciprocating device and engine of the invention, as indicated generally by numeral 10, with reference being first made to the numbered items of FIG. 1. In FIG. 2, the same numbers refer to like parts.

As seen in FIG. 1, two ends 12 and 14 of a horizontal, intermediate ram or piston 16 are located between two vertical pistons 18 and 20, 18 and 20 having suitable rings 22 and 24. The vertical and horizontal dispositions of the pistons and their associated chambers are given by way of illustration only.

Engine 10 further includes a timing device 26 electrically connected to a battery 28. Timing device 26 (only diagrammatically depicted in FIGS. 1 and 2) may be the well-known, solid state, electronic distributor now generally employed in the ignition system of Chrysler automobiles, though other timing and distributor devices may be used. (In FIG. 3, for purposes of clarity of explanation, 26 is shown schematically as including a rotatable, double pole switching device 29.) A crankshaft 30 is mechanically connected to 26 and to a flywheel 32, via bearings disposed in a housing 34 and a bevel gear arrangement 36 located beneath 26. A rod or shaft 38 connected to one gear of the bevel gear arrangement mechanically connects the crankshaft to timing device 26.

Ram or piston 16 is mounted in a horizontal chamber 44. At the ends of 44 are disposed two electrical coils 40 and 42. Adjacent 40 and 42 are the ends 12 and 14 of ram 16 (in FIG. 1), which ends comprise two pistons having rings 46 and 48, respectively. The material of pistons 12 and 14 is iron or other magnetic (magnetizable) material. The right end of chamber 44 in FIG. 1 is connected in fluid communication with a cylinder chamber 50, which chamber houses vertical piston 18. At the left of chamber 44, a vertical cylinder chamber 52 houses vertical piston 20. Connecting rods 54 and 56 connect pistons 18 and 20 to crankshaft 30.

Engine 10 may include additional cylinders, such as piston 58 (with rings 62) in chamber 60. A connecting rod 64 connects piston 58 to crankshaft 30.

If desired, ram 16 may be duplicated in a line of vertical cylinder groupings of two, each two groups being joined by a horizontal connecting shaft 66 located in a horizontal chamber 68. The right end 70 of a ram 72 is shown connected to 66 for movement by ram 16. A coil 73 is visible in FIG. 1 at the right-hand end of chamber 68. A like coil is located at the other end of 68.

Electrical conductor pairs 74 and 76 connect the respective coils 42 and 40 of horizontal chamber 44 to the timer 26. A similar pair of leads (not shown) would connect the solenoids in chamber 68 (if used) to 26. Electrical leads 78 and 80, and a switch 81, connect the timer to battery 28.

The operation of engine 10 is as follows. Switch 81, which may be an automotive ignition type switch, is closed in the circuit of battery 28 to energize timing device 26. 26, when energized, alternately connects the potential (voltage) of battery 28 across coils 40 and 42, thereby causing current to flow in the respective coils, the amount of the current being that amount made available by battery 28. This current flow generates a magnetic field that extends into the interior of cylinder 44 from the energized coil and magnetizes the iron of the piston (12 or 14) that is adjacent the coil that is energized. For example, if coil 40 is energized (in FIG. 1), the magnetic field created by 40 magnetizes piston 12, which is located away from 40 because of the cycle of engine 10 and timer 26, and draws 12 to coil 40. Ram 16 is thus translated to the right in chamber 44 of FIG.

1, and piston 14 is moved away from its coil 42. The timer (26) now disconnects coil 40 from battery 28 and applies the potential of 28 to coil 42. The above process is now reversed, i.e., piston 14 is now magnetized and drawn to 42. Again, when this occurs, 42 is deenergized and 40 energized to return the ram toward 40.

The manner in which 26 alternates the potential is explained hereinafter in reference to FIG. 3. The above movement of pistons 12 and 14 (of ram 16) causes corresponding changes in pressure in vertical chambers 50 and 52, which effect translation of pistons 18 and 20, and thus rotation of crankshaft 30 and flywheel 32. The rotation of the crankshaft, in turn, rotates rod 38 to effect the above alternation of potentials applied to 40 and 42 by 26.

As indicated earlier, timing device 26 may be an electronic, automotive distributor, though a conventional, mechanical distributor will function satisfactorily. As is well known, a distributor sequentially orders the application of a high voltage to the spark plugs of an internal combustion engine by sequentially charging a capacitor (within 26) at appropriate times in the cycle of operation of the engine. In the present case, timing means 26 operates in accordance with the cycle of engine 10, without a capacitor, as determined by the position of crankshaft 30 and rod 38 (connecting distributor 26 to 30), and is connected to alternately apply the potential of 28 to 40 and 42, i.e., as seen in FIG. 3 of the drawing, the double pole device 29 of 26 is operable at 180° and 360° positions to alternately connect 40 and 42 across battery 28. If the cycle of engine 10 is such that ram 16 is located to the left in chamber 44 (adjacent end wall 42), the double pole switch 29 operates to apply the voltage of 28 to coil 40 of cylinder 44 (which pulls piston 12 to 40 in the manner explained above). 29 now opens the circuit between the battery and coil 40, still referring to FIG. 3, and effects connection of the other coil (42) to battery 28. Ram 16 is thereby translated in 44, the resultant translation of vertical pistons 20 and 22 effecting the alternate operation of 26 through rotation of crankshaft 30 and rod 38, as explained above.

In the embodiment of FIG. 2, an optional booster ram or piston 82 is shown disposed in a horizontal chamber 86, 86 being located immediately above and generally parallel to intermediate chamber 44. Piston 82 and a ram 14 (in FIG. 2) are shown tied together by suitable rigid means 84 extending between them, and through elongated slots 85 provided in the walls of chambers of 86 and 44. A connecting rod 90 may be employed in the manner of rod 66 in FIGS. 1 and 2.

The operation of the embodiment of FIG. 2 is essentially the same as that of FIG. 1, as piston 82 is suitably influenced by the electromagnetic fields alternately established adjacent the ends of 82 and the ends of chamber 86 by the alternate application of potentials to coils (40 and 42) located at the ends of 86. The double action afforded by the two intermediate rams increases the force at which the vertical pistons are translated and thus the force applied to the crankshaft and flywheel.

All of the vertical chambers may be provided with vents, such as 88. A suitable operating fluid for the chambers may be a non-volatile gaseous material, such as atmospheric air, or a liquid, such as lightweight oil.

While the invention has been described in terms of preferred embodiments, the claims appended hereto are intended to encompass all embodiments which fall within the spirit of the invention.

What is claimed is:

1. A reciprocating device comprising, in cooperative association,
    at least one pair of pistons and connecting rods mounted in respective associated cylinder chambers,
    a piston and cylinder chamber located intermediate said pair of pistons and associated chambers, the intermediate chamber being connected in fluid communication with said pair of chambers,
    an electrical coil located at each end of the intermediate chamber,
    means for alternately applying an electrical potential to the coils of the intermediate chamber,
    the alternate application of the electrical potential to the coils being effective to move the intermediate piston back and forth in the intermediate chamber, and thereby effect translation of the pair of pistons in their respective chambers.

* * * * *